July 10, 1928.　　　　　　　　　　　　　　　1,676,483
W. E. DUTHIE
VALVE GRINDER
Filed Aug. 25, 1926
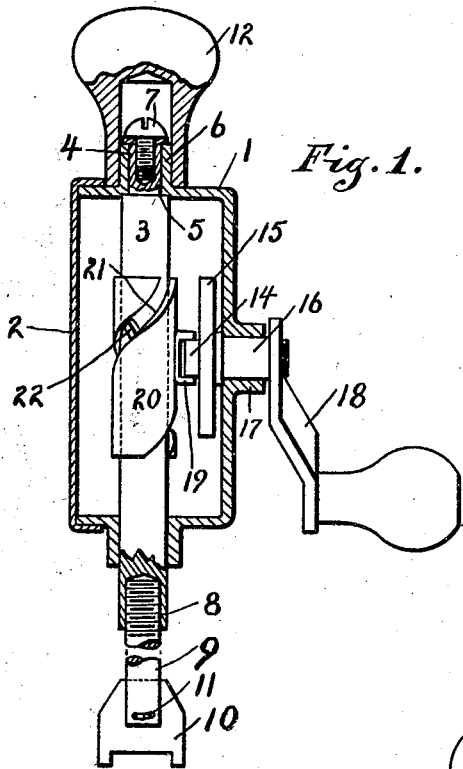
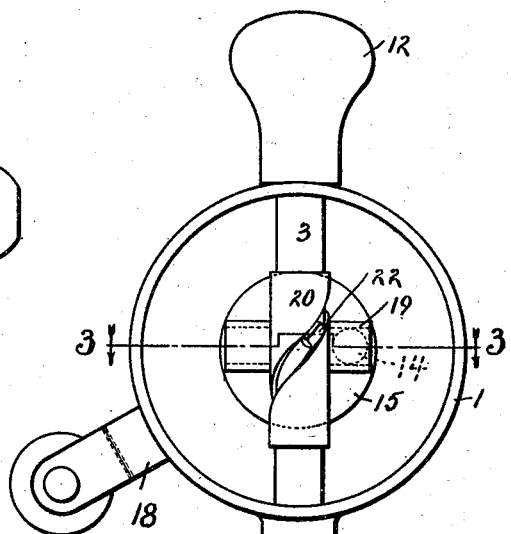
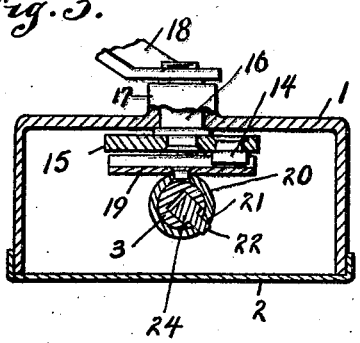
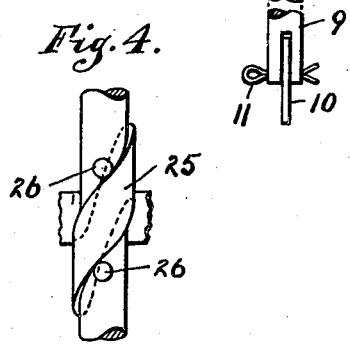
INVENTOR.
William E. Duthie,
BY
Hood + Hahn.
ATTORNEYS Patented July 10, 1928.

1,676,483

UNITED STATES PATENT OFFICE.

WILLIAM E. DUTHIE, OF INDIANAPOLIS, INDIANA.

VALVE GRINDER.

Application filed August 25, 1926. Serial No. 131,321.

My invention relates to improvements in valve grinders for automobile valves and the like. It is one of the objects of my invention to construct a device of the above character which will impart to the valve an oscillating movement by the simple rotation of a crank arm and which may be manufactured at an extremely small cost.

For the purpose of disclosing my invention I have illustrated certain embodiments thereof in the accompanying drawings in which Fig. 1 is a side elevation, partly in section, of a valve grinder embodying my invention;

Fig. 2 is a front elevation thereof;

Fig. 3 is a sectional view taken on the line 3—3 of Fig. 2, and

Fig. 4 is a detail view of a modification.

In the embodiment of the invention illustrated I provide a casing 1 which may be cylindrical and is provided with a cover head 2. Rotatably mounted in and extending through this casing is a shaft 3, one end of which is reduced as at 4 to provide a shoulder 5. The reduced portion extends through a boss 6 in the top of the casing and is internally screw threaded to receive a holding screw 7 which retains the shaft 3 in position and at the same time permitting it to rotate. The lower end of the shaft 3 is internally screw threaded as at 8 to receive the screw threaded end of an extension member 9 having at its lower end the valve-engaging head 10 which fits within a slot in the extension 9 and is held pivotally therein by a cotter pin 11. A bearing handle 12 fits over the boss 6 on the casing 1 and provides a means for exerting pressure on the device.

The shaft 5 is oscillated to impart to the valve to be ground an oscillatory rotary movement by means of a mechanism including a crank pin 14 mounted on a disc 15 in turn secured to a shaft 16 mounted in a bearing boss 17 in the casing 1. This shaft is rotated by a crank handle 18 which is threaded on the exterior end of the shaft 16. The crank arm 14 operates in a transversely extending bearing block 19, grooved or journaled to receive the crank, which bearing block is mounted on a cam member 20 comprising a tube having formed therein a spiral cam slot 21 in which operates a pin 22 mounted on the shaft 3. This pin 22 does not necessarily have to be rigidly fastened in the shaft and is preferably mounted in position by providing a transversely extending opening in the shaft in which the bottom of the pin is dropped. Due to the fact that the base portion 24 of the pin is slightly larger than the slot 21, after the pin has been placed in position and moved into the slot 21 the pin will be retained against dropping out.

The operation of the device is obvious. By rotating the crank handle 18 the crank arm 14 is rotated and due to its sliding engagement with the slide block 19 imparts to the block and the cam sleeve 20 a reciprocating movement which in turn, due to the engagement of the pin 22 in the cam slot 21, imparts to the shaft 3 a rotary oscillating movement.

In Fig. 4 I have illustrated a modification wherein the sleeve surrounding the shaft 3 comprises a spiral cam 25 engaged on its opposite sides by a pair of pins 26—26 secured in the shaft.

Due to the simplicity of the parts the entire structure, with the exception of the shafts, may be formed from sheet metal stampings.

I claim as my invention:

In a valve grinder, the combination with a casing, of a shaft mounted therein to rotate on a vertical axis and held against vertical movement therein, a spiral cam sleeve surrounding said shaft, intermediate of its ends, rotatably fixed and reciprocable with respect to said shaft, fixed means on the shaft engaging the cam face of said sleeve, a transversely extending grooved bearing block secured to said sleeve intermediate of its ends, a crank pin engaging in the groove of said bearing block and a crank handle for rotating said crank pin to impart a vertically reciprocating movement of the sleeve to thereby impart to the shaft an oscillating rotary movement, the shaft of said crank handle extending at right angles to the first mentioned shaft and mounted in said casing.

In witness whereof, I, WILLIAM E. DUTHIE, have hereunto set my hand at Indianapolis, Indiana, this 21st day of August, A. D. one thousand nine hundred and twenty-six.

WILLIAM E. DUTHIE.